United States Patent Office 2,764,553
Patented Sept. 25, 1956

2,764,553

COMPOSITION OF ALCOHOL AND LITHIUM CHROMATE

Winslow H. Hartford, Baltimore, Md., assignor, by mesne assignments, to Allied Chemical & Dye Corporation No Drawing. Application January 20, 1954, Serial No. 405,258

3 Claims. (Cl. 252—74)

This invention relates to the low molecular weight alcohols methanol and ethanol for use as anti-freeze agents, and has for its object the provision of compositions of such alcohols containing appreciable amounts of lithium chromate in solution as a corrosion inhibitor. For convenience, the term "lithium chromate" will be used herein, and especially in the claims, to cover both lithium chromate as such and the hydrate, notably the dihydrate, although the percentages will be in terms of the chromate.

The invention provides metal containers, such as those formed of steel, tin plate or aluminum, of such alcohols containing such an amount of lithium chromate in solution that when the alcohol is added to water in the amount necessary to provide protection as an anti-freeze agent the lithium chromate will be an effective corrosion inhibitor in the cooling systems of internal combustion engines, and in the heating systems of buildings, and the like.

It has long been known that soluble chromates are outstanding corrosion inhibitors for all types of recirculating water systems, and are particularly effective where several metals are used in the construction of the system as in most automotive cooling systems. Moreover, the use of water-soluble chromates eliminates the deposition of an oily film on the heat-transfer surfaces, such as occurs when the water-insoluble alcohol-soluble inhibitors in common use in packaged anti-freezes, are employed.

It is desirable to maintain chromate concentrations in cooling systems in the order of 1000 to 5000 p. p. m. or from 0.1 to 0.5% or higher in order to prevent corrosion of iron or steel. Alcohols are quite commonly used in 15% to 25% concentration by volume to protect automobile cooling systems, and the like, providing protection as shown in the following table:

| Percent of Alcohol by Volume | Freezing point, °F. | |
|---|---|---|
| | Methanol | Ethanol |
| 15 | +17° | +23° |
| 20 | +10° | +17° |
| 25 | +3° | +12° |

It is apparent that the packaged anti-freeze should contain at least six times the amount of chromate desired in the diluted alcohol, or from 0.6 to 3.0%, to provide the necessary anti-corrosion protection in the cooling system. The most soluble of the common chromates, sodium chromate, has a solubility of only 0.35% in methanol, and 0.005% in ethanol. This solubility of sodium chromate in alcohols may be increased by diluting the alcohols with water, but not to a usable value without dilution beyond the value specified as the maximum water content in volatile anti-freezes. Thus:

| Percent by volume: | Percent $Na_2CrO_4$ |
|---|---|
| 100 | 0.35 |
| 95 | 0.52 |
| 90 | 1.25 |

I have found that both lithium chromate, $Li_2CrO_4$, and its dihydrate, $Li_2CrO_4.2H_2O$, possess high solubilities in methanol and ethanol and in this respect are unlike most chromates which are relatively insoluble in these alcohols. These lithium compounds possess the corrosion-inhibiting properties common to chromates, and further give a stable alcoholic solution, particularly when protected from light, as by sealing in a metal container. The solubility of anhydrous lithium chromate in methanol, for instance, is 13.4% at 33° F. and 15.7% at 76° F., and that of lithium chromate dihydrate is even higher. The packaged anti-freeze may contain amounts of lithium chromate of the order of 0.6% up to the limit of solubility.

The compounds are readily prepared by the action of chromic acid on lithium hydroxide or carbonate, or by other methods apparent to those skilled in the art. The anhydrous salt may be crystallized above 166° F. and the dihydrate below this temperature. By virtue of its high $CrO_3$ content, a proportionately smaller quantity of anhydrous lithium chromate may be used to give the same degree of corrosion inhibition as that obtained from chromates of higher molecular weight.

My invention provides solutions of lithium chromate in a monohydric alcohol of the group consisting of methanol and ethanol containing such an amount of lithium chromate that the alcohol can be diluted for use in aqueous heat-transfer solutions for use in automobile radiators, and the like, and still provide such a concentration of chromate that corrosion is inhibited. The alcohols of the type used for anti-freeze purposes may contain a small amount of water, either as a result of preparation and packaging or due to absorption from the air when the can or drum is opened for partial removal. Such alcohols are designated in the claims by the term "substantially anhydrous." This moisture can corrode the metal and contaminate the alcohol. Alcohols containing lithium chromate according to my invention can be left for long periods in corrodible metal containers without impairment of the alcohol or the container.

A typical example of my invention, but one to which I do not wish to be limited, is as follows:

Three ounces (85 grams) of lithium chromate dihydrate, $Li_2CrO_4.2H_2O$, is dissolved in one gallon of technical anhydrous methanol and packaged by suitable means into a closed lightproof sheet steel container until ready for use. When this solution is added to a typical automobile cooling system, the following corrosion resistant and anti-freeze properties are obtained:

| Capacity of Cooling System, quarts | $Li_2CrO_4.2H_2O$, p. p. m. | Freezing Point, °F. |
|---|---|---|
| 12 | 7,470 | −10 |
| 16 | 5,604 | +3 |
| 20 | 4,484 | +10 |
| 24 | 3,737 | +15 |

This application is a continuation-in-part of my application Serial Number 309,553, filed September 13, 1952, now abandoned.

I claim:

1. A solution of lithium chromate in a substantially anhydrous monohydric alcohol of the group consisting of methanol and ethanol in an opaque metal container for use in liquid heat-transfer systems, the concentration of the lithium chromate in solution in the alcohol being from about 0.6% to complete saturation, and in such concentration that when the solution is added to a water cooling system as an anti-freeze agent, the lithium chromate is present in sufficient concentration to effectively inhibit corrosion.

2. A composition of matter consisting essentially of a substantially anhydrous alcohol of the group consisting of methanol and ethanol having in solution lithium chromate in concentration of from about 0.6% to its limit of solubility therein.

3. A composition of matter consisting essentially of substantially anhydrous methanol having in complete solution lithium chromate in an amount from about 0.6% to its limit of solubility therein, said composition being packaged in a metal container.

References Cited in the file of this patent
UNITED STATES PATENTS

| | | |
|---|---|---|
| 2,058,924 | Tiffany | Oct. 27, 1936 |
| 2,060,110 | Paxton | Nov. 10, 1936 |
| 2,246,665 | Buffington | June 24, 1941 |